US011300163B2

(12) United States Patent
Payne et al.

(10) Patent No.: US 11,300,163 B2
(45) Date of Patent: Apr. 12, 2022

(54) HYBRID MODULE INCLUDING MOTOR ROTOR CONNECTOR FOR CONNECTING TO A TORQUE CONVERTER

(71) Applicant: Schaeffler Technologies AG & Co. KG, Herzogenaurach (DE)

(72) Inventors: Matthew Payne, Glenmont, OH (US); Markus Steinberger, Macedonia, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 501 days.

(21) Appl. No.: 16/285,795

(22) Filed: Feb. 26, 2019

(65) Prior Publication Data

US 2020/0271173 A1   Aug. 27, 2020

(51) Int. Cl.
| F16D 11/10 | (2006.01) |
| H02K 7/00 | (2006.01) |
| F16D 1/116 | (2006.01) |
| B60K 6/40 | (2007.10) |
| F16D 127/06 | (2012.01) |
| F16D 11/00 | (2006.01) |
| B60K 6/48 | (2007.10) |

(52) U.S. Cl.
CPC ............... *F16D 11/10* (2013.01); *B60K 6/40* (2013.01); *F16D 1/116* (2013.01); *H02K 7/003* (2013.01); *H02K 7/006* (2013.01); *B60K 2006/4825* (2013.01); *F16D 2011/008* (2013.01); *F16D 2127/06* (2013.01); *F16D 2300/12* (2013.01)

(58) Field of Classification Search
CPC .... B60K 6/40; B60K 6/48; B60K 2006/4825; H02K 7/003; H02K 7/006; F16H 45/00; F16D 1/108; F16D 1/112; F16D 1/116; Y10T 403/7045; Y10T 403/7075
USPC ......................................................... 403/364
See application file for complete search history.

(56) References Cited

U.S. PATENT DOCUMENTS

| 3,191,453 A | * | 6/1965 | Hoven ..................... F16D 1/116 74/432 |
| 10,821,819 B2 | * | 11/2020 | Heuver ................. H02K 7/108 |
| 2008/0023287 A1 | | 1/2008 | Thiede et al. |

(Continued)

FOREIGN PATENT DOCUMENTS

| JP | 2012-229719 A | 11/2012 |
| JP | 2018-009679 A | 1/2018 |

OTHER PUBLICATIONS

Corresponding Search Report for International Application No. PCT/US2020/019278.

*Primary Examiner* — Richard M Lorence
(74) *Attorney, Agent, or Firm* — Davidson, Davidson & Kappel, LLC

(57) ABSTRACT

A hybrid module is configured for arrangement in a torque path upstream from a transmission and downstream from an internal combustion engine. The hybrid module includes a hybrid drive unit including an electric motor including a rotor. The hybrid module also includes a torque converter and a connector non-rotatably fixing the rotor to the torque converter. The connector includes a first section non-rotatably fixed to the rotor, a second section non-rotatably fixed to the torque converter and a retainer axially fixing the first section and the second section together in an intermeshing arrangement so the first section and the second section are non-rotatably fixed together.

19 Claims, 6 Drawing Sheets

(56) References Cited

U.S. PATENT DOCUMENTS

| | | |
|---|---|---|
| 2011/0132709 A1 | 6/2011 | Fukunaga et al. |
| 2015/0166049 A1 | 6/2015 | Frait et al. |
| 2016/0109010 A1 | 4/2016 | Lindemann et al. |
| 2018/0058559 A1 | 3/2018 | Pyers et al. |

* cited by examiner

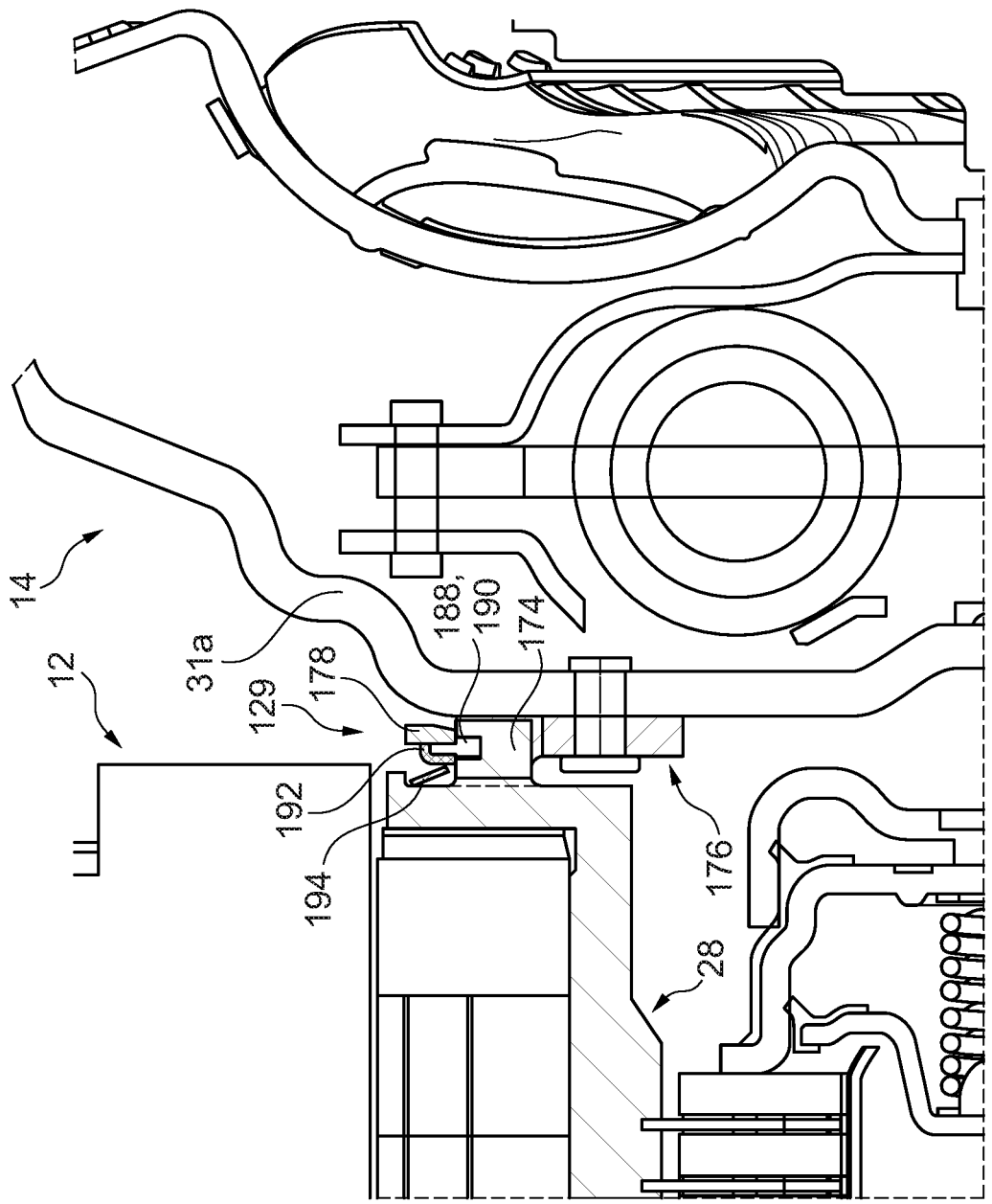

HYBRID MODULE INCLUDING MOTOR ROTOR CONNECTOR FOR CONNECTING TO A TORQUE CONVERTER

The present disclosure relates generally to electric motor rotors and more specifically to electric motor rotors in hybrid modules.

BACKGROUND

Electric motor rotor carriers are generally riveted to the torque converter front cover.

SUMMARY OF THE INVENTION

A hybrid module configured for arrangement in a torque path upstream from a transmission and downstream from an internal combustion engine is provided. The hybrid module includes a hybrid drive unit including an electric motor including a rotor. The hybrid module also includes a torque converter and a connector non-rotatably fixing the rotor to the torque converter. The connector includes a first section non-rotatably fixed to the rotor, a second section non-rotatably fixed to the torque converter and a retainer axially fixing the first section and the second section together in an intermeshing arrangement so the first section and the second section are non-rotatably fixed together.

In embodiments of the hybrid module, the first section may include first teeth and the second section may include second teeth, with the first teeth intermeshing with the second teeth. Each of the first teeth and each of the second teeth may include a respective groove formed therein and the retainer may be received in each of the grooves. The retainer may be a snap ring. The snap ring may include a tapered surface received in each of the grooves. The first teeth may protrude axially away from the rotor and the second teeth may protrude axially away from the torque converter. The rotor may include a rotor carrier supporting a plurality of rotor magnet segments. The first section may be fixed to a rear end of the rotor carrier. The first section may be formed integrally as a single piece with the rotor carrier. The torque converter may include a front cover, and the second section may be fixed to the front cover by a plurality of circumferentially spaced fasteners. The connector may further include a retention ring holding the retainer in place on the first section and the second section. The hybrid module may further include an elastic element forcing the retention ring axially against the retainer.

A method of constructing a hybrid module configured for arrangement in a torque path upstream from a transmission and downstream from an internal combustion engine is also provided. The method includes non-rotatably fixing together a hybrid drive unit and a torque converter via a connector. The hybrid drive unit includes an electric motor including a rotor. The connector includes a first section non-rotatably fixed to the rotor, a second section non-rotatably fixed to the torque converter and a retainer axially fixing the first section and the second section together in an intermeshing arrangement so the first section and the second section are non-rotatably fixed together.

In embodiments of the hybrid module, the first section may include first teeth and the second section may include second teeth, and the first section and the second section may be forced axially together so the first teeth intermesh with the second teeth. Each of the first teeth and each of the second teeth may include a respective groove formed therein. The method may include axially forcing the retainer into each of the grooves. The method may further include forming the first section integrally as a single piece with the rotor carrier. The method may further include fixing the second section to the front cover by a plurality of circumferentially spaced fasteners. The method may further include providing a retention ring holding the retainer in place on the first section and the second section. The method may further include providing an elastic element forcing the retention ring axially against the retainer.

BRIEF DESCRIPTION OF THE DRAWINGS

The present invention is described below by reference to the following drawings, in which:

FIGS. 5 and 6 illustrate sections of the connector shown in FIG. 4 are joined together so the connector non-rotatably fixes a rotor carrier and a front cover together.

DETAILED DESCRIPTION

The present disclosure provides a spline connection between a torque converter and a rotor that is axially retained by a snap ring. Such a connection may allow speedy assembly and the ability to balance the torque converter and rotor separately, as opposed to a riveted design in which the components must be balanced as a unit. Additionally, the connection may be disassembled so that only the torque converter or rotor may be replaced during a repair, instead of the entire unit.

Figure 1:
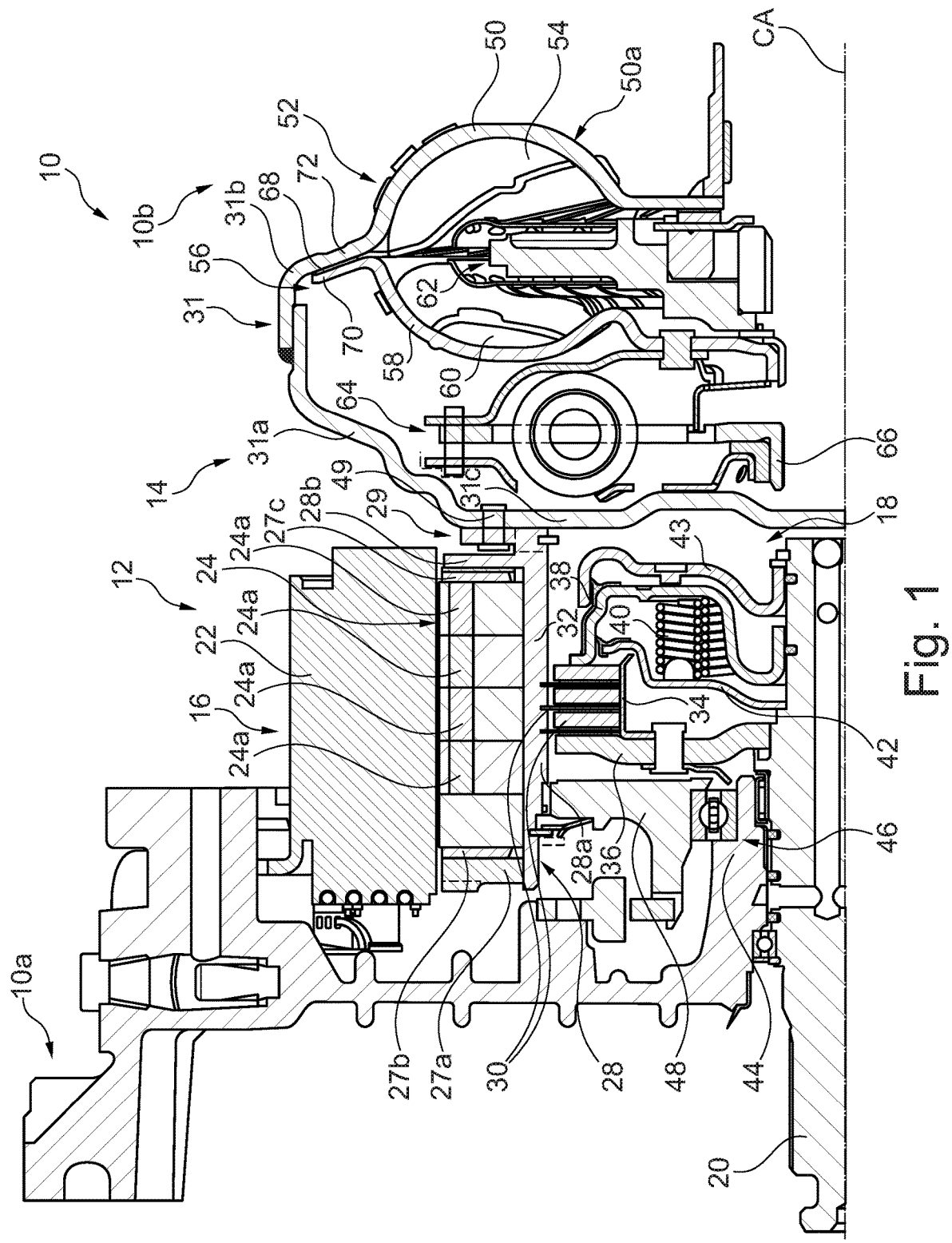
FIG. 1 shows a hybrid module in accordance with an embodiment of the present disclosure.

FIG. 1 shows hybrid module 10 in accordance with an embodiment of the present disclosure. Module 10 includes a hybrid drive unit 12 configured for attachment to an internal combustion engine at a front side 10a of module 10 and a torque converter 14 configured for attachment to a transmission input shaft at a rear side 10b of module 10. In a known manner, hybrid drive unit 12 is selectively operable to transmit torque from the internal combustion engine to torque converter 14 or directly drive torque converter 14 via an electric motor 16 of drive unit 12. Along these lines, hybrid drive unit 12 includes an engine connect/disconnect clutch 18 for selectively connecting torque converter 14 to an input shaft 20, which is configured for non-rotatably connecting for example via a flywheel to a crankshaft of the internal combustion engine, or disconnecting torque converter 14 from input shaft 20 such that torque converter can be driven solely by electric motor 16.

Electric motor 16 includes a stator 22 and a rotor 24, with stator 22 being fixed to a housing 26 of hybrid drive unit 12. Upon current being provided to coils of stator 22, rotor 24 is rotated about a center axis CA of hybrid module 10 in a known manner, due to rotor 24 including a plurality of permanent magnet segments 24a that are energized by the current in the coils. The terms axially, radially and circumferentially as used herein are used with respect to center axis CA. Magnet segments 24a are supported at their inner circumferences by a rotor carrier 28. Rotor carrier 28 includes a cylindrical axially extending section 28a supporting the inner circumferences of magnet segments 24a and a disc shaped radially extending section 28b protruding radially outward from an end of axially extending section 28a.

Electric motor 16 further includes a rotor clamping ring 27a fixed to axially extending section 28a for axially retaining rotor 24 on rotor carrier hub 28. Rotor clamping ring 27a is provided at a first axial end of rotor carrier hub 28 that is opposite to a second axial of rotor carrier hub 28 at which radially extending section 28b is provided, such that magnet segments 24a are clamped axially between section 28b and ring 27a. A first non-ferrous plate 27b is provided axially between rotor 24 and ring 27a and a second non-ferrous plate 27c is provided axially between rotor 24 and section 28b. Plates 27b, 27c may be formed of aluminum and contact the rotor magnets to block eddy currents, which are essentially short circuits of the magnetic flux field and lead to low e-motor efficiency. Torque converter 14 is non-rotatably fixed to hybrid drive unit 12 by a connector 29 that is discussed in further detail with respect to the following figures.

Clutch 18 includes a plurality of clutch plates 30, at least some of which are supported in an axially slidable manner at outer diameter ends thereof by splines 32 formed on an inner circumferential surface of axially extending section 28a. At least one of clutch plates 30 are supported in an axially slidable manner at inner diameter ends thereof by an inner support 34 that is fixed to a counter pressure plate 36, which is nonrotatably fixed to shaft 20. Clutch 18 further includes a piston 38 that is axially slidable along an outer circumference of shaft 20 to engage and disengage clutch 18 based on fluid pressure differences on front and rear sides of piston 38. When piston 38 forces clutch plates 30 against counter pressure plate 36, clutch 18 is engaged and torque from shaft 20 is transmitted through clutch plates 30 into rotor carrier hub 28, which then transmits the received torque to damper assembly 14. Piston 38 is held axially away from clutch plates 30 by a spring 40 supported by a support plate 42. Piston 38 is also resiliently connected to a liftoff control plate 43 that limits the liftoff of piston 38 with respect to clutch plates 30.

Housing 26 includes an axially extending protrusion 44 provided on an engine side of clutch 18 radially outside of shaft 20. Protrusion 44 supports a ball bearing 46, which rotatably supports a rotor flange 48 on protrusion 44. An inner race of ball bearing 46 sits on an outer circumferential surface of protrusion 44 and rotor flange 48 extends from an outer circumferential surface of the outer race of ball bearing 46 to axially extending section 28a of rotor carrier hub 28.

Torque converter 14 includes a front cover 31a and a rear cover 31b together forming cover 31, with fasteners 49 of connector 29 passing axially through a radially extending section 31c of front cover 31a, which extends radially inward to intersect center axis CA. Rear cover 31b forms an impeller shell 50 of an impeller 52 that includes a plurality of impeller blades 54, which are supported by a rounded blade supporting portion 50a of impeller shell 50, which is shaped as an annular bowl and contacts rear edges of impeller blades 54.

Torque converter 14 also includes a turbine 56 configured to define a piston that is axially moveable toward and away from impeller shell 50 such that an engagement section of turbine 56 engages an engagement section of impeller shell 50 so as to form a lockup clutch. Turbine 56 includes a turbine shell 58 supporting a plurality of turbine blades 60. Torque converter 14 also includes a stator 62 axially between turbine 56 and impeller 52 to redirect fluid flowing from the turbine blades 60 before the fluid reaches impeller blades 54 to increase the efficiency of torque converter 14. Torque converter 14 further includes a damper assembly 64 fixed to turbine shell 58. Damper assembly 64 is configured for receiving torque from turbine shell 58 and transferring torque to the transmission input shaft. For transferring torque to the transmission input shaft, damper assembly 64 includes a support hub 66, which includes a splined inner circumferential surface for non-rotatably connecting to an outer circumferential surface of the transmission input shaft.

A friction material 68 is bonded onto a radially extending impeller facing surface of an outer radial extension 70 of turbine shell 58, which is radially outside of blades 60 and forms the engagement section of turbine 56, for engaging a radially extending wall 72 of impeller shell 50, which is radially outside of blades 54 and forms the engagement section of impeller shell 50. In other embodiments, instead of or in addition to being bonded to outer radial extension 70, friction material 68 may be bonded to radially extending turbine facing surface of radially extending wall 72 or to one or more additional discs between radially extension 70 and wall 72. Regardless of whether friction material 68 is bonded to outer radial extension 70, radially extending wall 72 or one or more additional discs, friction material 68 is provided axially between extension 70 and wall 72 to selectively rotationally engage the engagement section of turbine piston 56 with the engagement section of impeller shell 50. Torque converter 14 receives torque input from hybrid drive unit 12 through fasteners 29 at front cover 31a, which is transmitted to impeller 52. Impeller 52 drives turbine 56 via fluid flow from impeller blades 54 to turbine blades 60, when the lockup clutch is disengaged, or via friction material 68, when the lockup clutch is engaged. Turbine 56 then drives damper assembly 64, which in turn drives the transmission input shaft.

Figure 2:
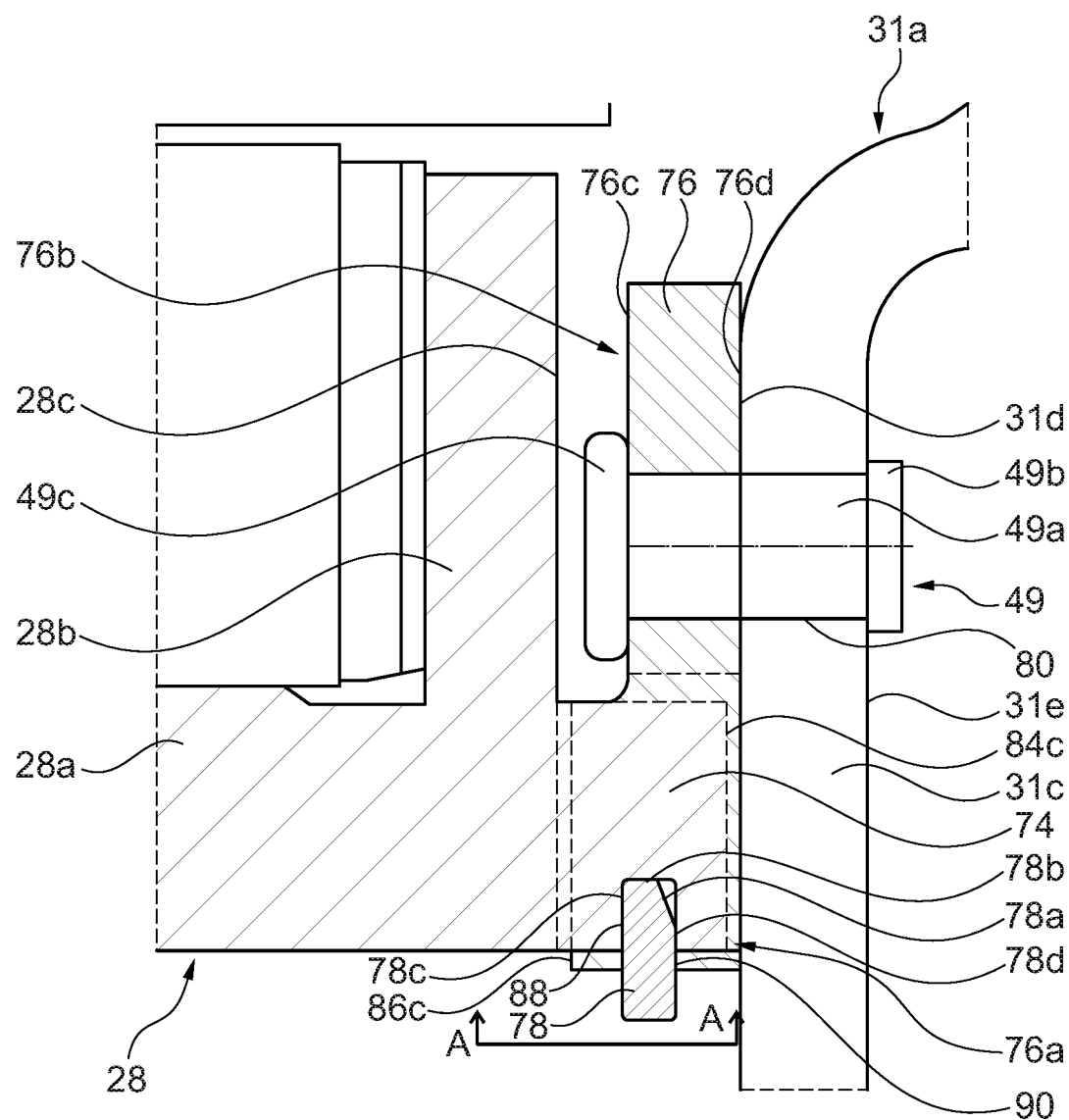
FIG. 2 schematically shows an enlarged view of a portion of the hybrid module shown in FIG. 1 including a connector in accordance with an embodiment of the present disclosure.

FIG. 2 schematically shows an enlarged view of a portion of hybrid module 10 shown in FIG. 1 to illustrate connector 29. Connector 29 includes a first section 74 that is non-rotatably fixed to rotor carrier 28, a second section 76 that is non-rotatably fixed to front cover 31a, a retainer 78 fixing sections 74, 76 axially together and a plurality of circumferentially spaced fasteners 49 each extending through a respective hole 80 formed in radially extending section 31c of front cover 31a. In the embodiment shown in FIG. 2, first section 74 is formed integrally as a single piece with rotor carrier 28, second section 76 is formed as plate fixed to a front and outer surface 31d of front cover section 31c by fasteners 49 in the form of rivets and retainer 78 is formed as a snap ring.

First section 74 is formed at a rear end of rotor carrier 28, more specifically at a rear end of cylindrical section 28a of rotor carrier 28, protruding axially rearward past a radially extending rear surface 28c of rotor carrier 28. Second section 76 includes an engagement section 76a for engaging with first section 74 and a base section 76b for receiving rivets 49. In the embodiment shown in FIG. 2, base section 76b is radially outward from engagement section 76a and includes a plurality of circumferentially spaced holes 82 passing axially therethrough receiving fasteners 49. Each fastener 49 includes a shank 49a that is received inside of the respective holes 80, 82, a rear head 49b contacting an inner and rear radially extending surface 31e of front cover section 31c and a front head 49c contacting a front radially extending surface 76c of base section 76b. Fasteners 49 hold second section 76 axially against front cover 31a such that a rear radially extending surface 76d of second section 76 contacts front radially extending surface 31d of front cover section 31c.

Figure 3:
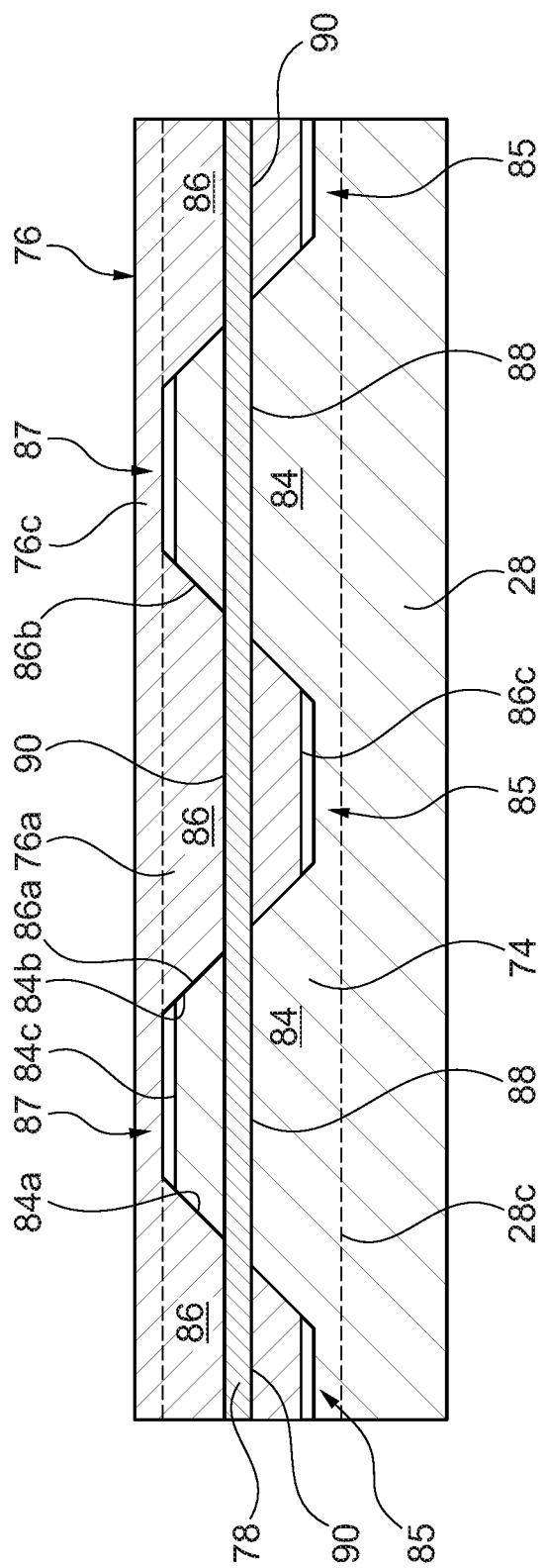
FIG. 3 shows a view of the connector 29 along A-A in FIG. 2.

FIG. 3 shows a view of connector 29 along A-A in FIG. 2. As shown in FIG. 3, first section 74 includes a plurality of circumferentially spaced first teeth 84 protruding axially from rotor carrier 28 and engagement section 76a of second section 76 includes a plurality of circumferentially spaced second teeth 86 protruding axially from a support portion 76c of engagement section 76a. Teeth 84, 86 each have a trapezoidal shape. More specifically, teeth 84 each include two lateral edges defined by two sloped surfaces 84a, 84b that tapered towards each other while extending axially away from rotor carrier 28 and join opposite circumferential edges of an end face 84c. Similarly, teeth 86 each include two lateral edges defined by two sloped surfaces 86a, 86b that tapered towards each other while extending axially away from front cover 31a and join opposite circumferential edges of an end face 86c. Teeth 84 are circumferentially separated from each other by a plurality of circumferentially spaced gaps 85 and teeth 86 are separated from each other by a plurality of circumferentially spaced gaps 87. This configuration allows teeth 84 to intermesh with teeth 86, with each of teeth 84 being received in a respective one of gaps 87 and each of teeth 86 being received in a respective one of gaps 85. Each sloped surface 86a contacts one sloped surface 84b and each sloped surface 86b contacts one sloped surface 84a. Teeth 84, 86 form a spline connection that non-rotatably fixes sections 74, 76 together such that during operation of hybrid module torque is transmitted from rotor carrier 28 to torque converter 14 via teeth 84, 86.

Referring to FIGS. 2 and 3 together, first section 74 and second section 76 are axially retained together via retainer 78 contacting both of sections 74, 76, with retainer 78 being held in first grooves 88 formed in first section 74 and second grooves 90 formed in second section 76. More specifically, retainer 78 contacts each of teeth 84 and each of teeth 86; and retainer 78 is held in grooves 88 formed in inner circumferential surfaces 74a of each of teeth 84 and is held in grooves 90 formed in inner circumferential surfaces 76e of each of teeth 86. Accordingly, retainer 78 axially aligns grooves 88 with grooves 90 while axially fixing sections 74, 76 together to wedge the mating teeth 84, 86 together such that lash is removed from the connection. As shown in FIG. 2, an outer circumferential surface of retainer 78 includes a tapered surface portion 78a. The outer circumferential surface of retainer 78 also includes a flat surface portion 78b defining an outermost surface of retainer 78, and two flat radially extending side surfaces 78c, 78d. Each of surfaces 78b, 78c, 78d contacts a respective flat surface of each of grooves 88, 90 so that tapered surface portion 78a is fully in grooves 88, 90.

Figure 4:
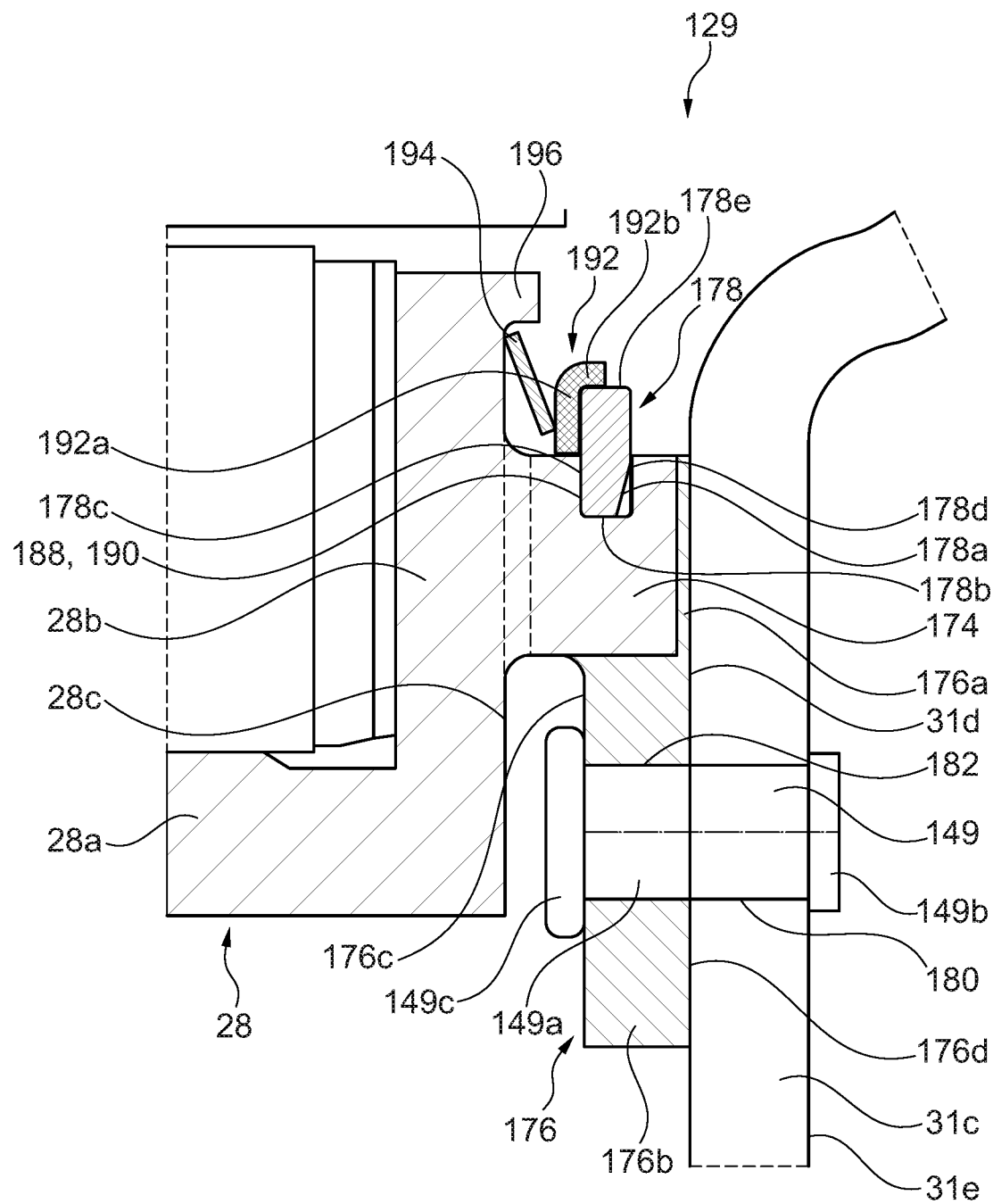
FIG. 4 schematically shows an enlarged view of a portion of a hybrid module including a connector in accordance with another embodiment of the present disclosure.

FIG. 4 schematically shows an enlarged view of a portion of hybrid module 10 including a connector 129 in accordance with another embodiment of the present disclosure. Connector 129 is formed in a similar manner as connector 29 with intermeshing teeth configured in the same manner as teeth 84, 86 shown in FIG. 3. Connector 129 includes a first section 174 that is non-rotatably fixed to rotor carrier 28, a second section 176 that is non-rotatably fixed to front cover 31a, a retainer 178 fixing sections 174, 176 axially together and a plurality of circumferentially spaced fasteners 149 each extending through a respective hole 180 formed in radially extending section 31c of front cover 31a. In the embodiment shown in FIG. 4, first section 174 is formed integrally as a single piece with rotor carrier 28, second section 176 is formed as plate fixed to outer surface 31d of front cover section 31c by fasteners 149 in the form of rivets and retainer 178 is formed as a snap ring.

First section 174 is formed at the rear end of rotor carrier 28, more specifically at a rear side of disc shaped radially extending section 28b of rotor carrier 28, protruding axially rearward past radially extending rear surface 28c of rotor carrier 28. Second section 176 includes an engagement section 176a for engaging with first section 174 and a base section 176b for receiving rivets 149. In the embodiment shown in FIG. 4, base section 176b is radially inward from engagement section 176a and includes a plurality of circumferentially spaced holes 182 passing axially therethrough receiving fasteners 149. Each fastener 149 includes a shank 149a that is received inside of the respective holes 180, 182, a rear head 149b contacting rear radially extending surface 31e of front cover section 31c and a front head 149c contacting a rear radially extending surface 176c of base section 176b. Fasteners 149 hold second section 176 axially against front cover 31a such that a rear radially extending surface 176d of second section 176 contacts front radially extending surface 31d of front cover section 31c.

As noted above, in the same manner as the arrangement shown in FIG. 3, first section 174 includes a plurality of circumferentially spaced teeth protruding axially from rotor carrier 28 and engagement section 176a of second section 176 includes a plurality of circumferentially spaced teeth protruding axially from a support portion of engagement section 176a. The teeth of section 174 intermesh with the teeth of section 176 to form a spline connection that non-rotatably fixes sections 174, 176 together such that during operation of hybrid module torque is transmitted from rotor carrier 28 to torque converter 14 via the teeth of sections 174, 176.

First section 174 and second section 176 are axially retained together via retainer 178 contacting both of sections 174, 176, with retainer 178 being held in grooves 188 formed in outer circumferences of teeth of first section 174 and grooves 190 formed in outer circumferences of teeth of second section 176. Accordingly, retainer 178 axially aligns grooves 188 in the teeth of section 174 with the grooves 190 in the teeth of section 176 while axially fixing sections 174, 176 together to wedge the mating teeth together such that lash is removed from the connection. As shown in FIG. 4, an inner circumferential surface of retainer 178 includes a tapered surface portion 178a that allows ease of installation. The inner circumferential surface of retainer 178 also includes a flat surface portion 178b defining an outermost surface of retainer 178, and two flat radially extending side surfaces 178c, 178d. Each of surfaces 178b, 178c, 178d contacts a respective flat surface of each of grooves 188, 190 so that tapered surface portion 178a is fully in grooves 188, 190.

Connector 129 also includes retention ring 192 preventing retainer 178 from coming out of grooves 188, 190 during the rotation of connector 129 about axis CA (FIG. 1). An elastic element in the form of a diaphragm spring 194 holds retention ring 192 against retainer 178 and covering the OD. Retention ring 192 includes a radially extending section 192a axially abutting surface 178c of retainer 178 and an axially extending section 192b radially abutting an outer circumferential surface 178e of retainer 178. A radially inner end of diaphragm spring 194 axially contacts radially extending section 192a and a radially outer end of diaphragm spring 194 axially contacts radially extending rear surface 28c of rotor carrier 28 so that diaphragm spring 194 is axially compressed between rotor carrier 28 and retention ring 192 and holds retention ring 192 axially against retainer 178. Disc shaped radially extending section 28b of rotor carrier 28 is provided with an axial protrusion 196, which may be formed as a ring or one or more circumferentially segments, that helps radially align diaphragm spring 194.

Figure 5:
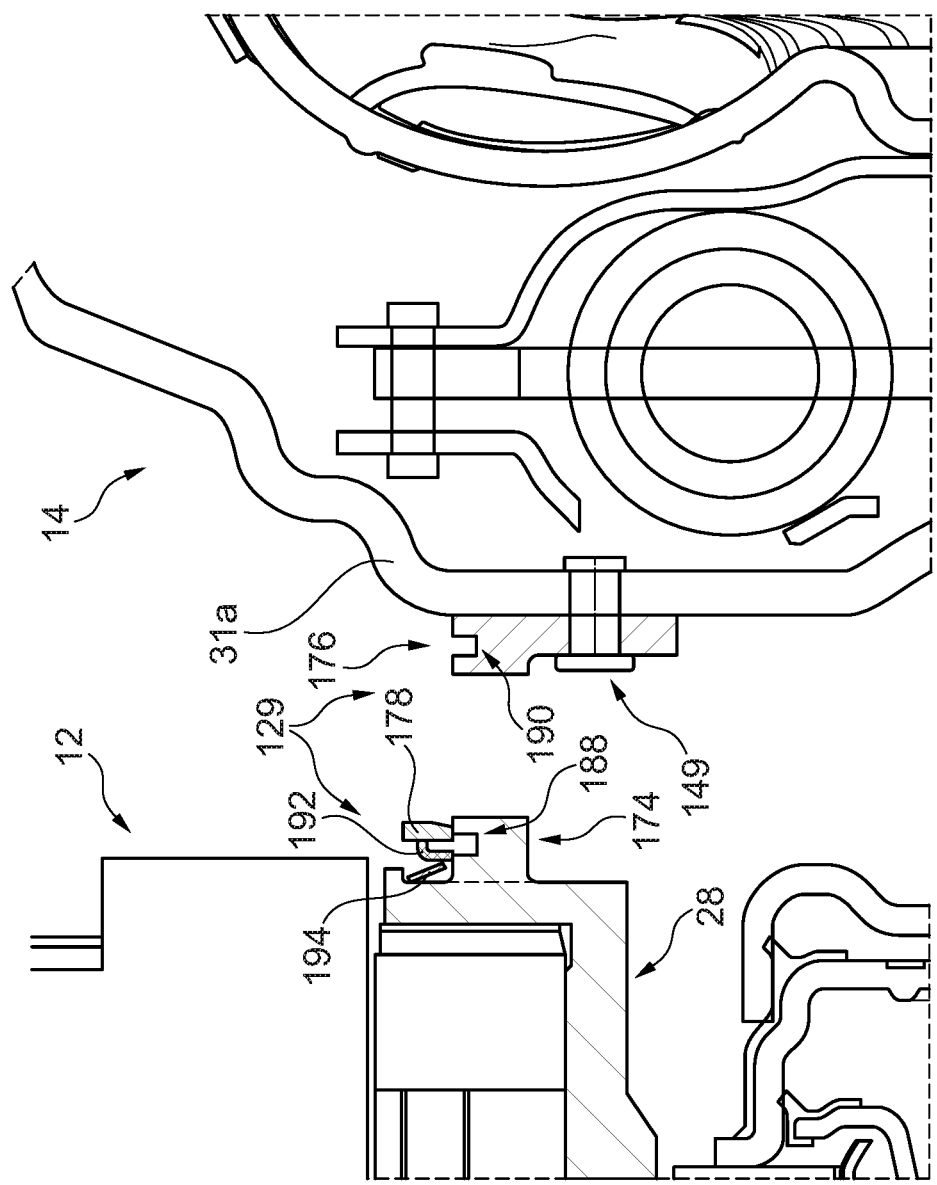

FIGS. 5 and 6 illustrate how sections 174, 176 of connector 129 are joined together so connector 129 non-rotatably fixes rotor carrier 28 and front cover 31a together. FIG. 5 shows torque converter 14 spaced apart from drive unit 12, with first section 174 fixed to drive unit 12 and spaced from second section 176, which is fixed to torque converter 14, before sections 174, 176 are joined together. Second section 176 is fixed to front cover 31a via fasteners 149 and retainer 178, retention ring 192 and diaphragm spring 194 are held on the outer circumferential surface of first section 174. Retainer 178 is held on a rear side of groove 188 and retention ring 192 and diaphragm spring 194 are held on a front side of groove. Next, drive unit 12 and torque converter 14 are brought together such that first section 174 and second section 176 contact and intermesh via the teeth of sections 174, 176 intermeshing, as shown in FIG. 6. After first and second sections 174, 176 are brought together in an intermeshing orientation such that grooves 188, 190 are axially aligned with each other, retainer 178 is forced axially frontward by a load, which axially compresses diaphragm spring 194 and moves retainer 178 into grooves 188, 190, causing retainer 178 to radially constrict in grooves 188, 190. At this time, retention ring 192 is forced axially rearward onto retainer 178 by diaphragm spring 194 to hold retainer 178 in grooves 188, 190 such that retainer 178 axially fixes first section 174 and second section 176 together.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

CA center axis
10 hybrid module
12 hybrid drive unit
14 torque converter
16 electric motor
18 engine connect/disconnect clutch
20 input shaft
22 stator
22a outer circumferential surface
24 rotor
24a magnet segments
26 housing
27a rotor clamping ring
27b non-ferrous plate
27c non-ferrous plate
28 rotor carrier hub
28a cylindrical axially extending section
28b disc shaped radially extending section
28c radially extending rear surface
29 connector
30 clutch plates
31 cover
31a front cover
31b rear cover
31c radially extending section of front cover
31d front and outer surface
31e rear and inner surface
32 splines
34 inner support
36 counter pressure plate
38 piston
40 spring
42 support plate
43 liftoff control plate
44 housing protrusion
46 ball bearing
48 rotor flange
49 fasteners
49a shank
49b rear head
49c front head
50 impeller shell
50a rounded blade supporting portion
52 impeller
54 impeller blades
56 turbine
58 turbine shell
60 turbine blades
62 stator
64 damper assembly
66 support hub
68 friction material
70 outer radial extension
72 radially extending wall
74 first connector section
74a inner circumferential surfaces
76 second connector section
76a engagement section
76b base section
76c front radially extending surface
76d rear radially extending surface
76e inner circumferential surfaces
78 retainer
78a tapered surface portion
78b, 78c, 78d flat surface portions
80 hole
82 hole
84 first teeth
84a, 84b sloped surfaces
84c end face
85 circumferentially spaced gaps
86 second teeth
86a, 86b sloped surfaces
86c end face
87 circumferentially spaced gaps
88 first grooves
90 second grooves
129 connector
149 fasteners
149a shank
149b rear head
149c front head
174 first connector section
176 second connector section
176a engagement section
176b base section
176c front radially extending surface
176d rear radially extending surface
178 retainer
178a tapered surface portion
178b, 178c, 178d flat surface portions
178e outer circumferential surface
188 first grooves
190 second grooves 192 retention ring
194 diaphragm spring

What is claimed is:

1. A hybrid module configured for arrangement in a torque path upstream from a transmission and downstream from an internal combustion engine, the hybrid module comprising:
   a hybrid drive unit including an electric motor including a rotor;
   a torque converter; and
   a connector non-rotatably fixing the rotor to the torque converter, the connector including a first section non-rotatably fixed to the rotor, a second section non-rotatably fixed to the torque converter and a retainer axially fixing the first section and the second section together in an intermeshing arrangement so the first section and the second section are non-rotatably fixed together, the retainer being a separate piece from the first and second sections and installed on inner circumferences or outer circumferences of the first and second sections.

2. The hybrid module as recited in claim 1 wherein the first section includes first teeth and the second section includes second teeth, the first teeth intermeshing with the second teeth.

3. The hybrid module as recited in claim 2 wherein each of the first teeth and each of the second teeth include a respective groove formed therein, the retainer being received in each of the grooves.

4. The hybrid module as recited in claim 3 wherein the retainer is a snap ring.

5. The hybrid module as recited in claim 4 wherein the snap ring includes a tapered surface received in each of the grooves.

6. The hybrid module as recited in claim 2 wherein the first teeth protrude axially away from the rotor and the second teeth protrude axially away from the torque converter.

7. The hybrid module as recited in claim 1 wherein the rotor includes a rotor carrier supporting a plurality of rotor magnet segments, the first section being fixed to a rear end of the rotor carrier.

8. The hybrid module as recited in claim 7 wherein the first section is formed integrally as a single piece with the rotor carrier.

9. The hybrid module as recited in claim 1 wherein the torque converter includes a front cover, the second section being fixed to the front cover by a plurality of circumferentially spaced fasteners.

10. The hybrid module as recited in claim 1 wherein the connector further includes a retention ring holding the retainer in place on the first section and the second section.

11. The hybrid module as recited in claim 10 further comprising an elastic element forcing the retention ring axially against the retainer.

12. A method of constructing a hybrid module configured for arrangement in a torque path upstream from a transmission and downstream from an internal combustion engine, the method comprising:
   non-rotatably fixing together a hybrid drive unit and a torque converter via a connector, the hybrid drive unit including an electric motor including a rotor, the connector including a first section non-rotatably fixed to the rotor, a second section non-rotatably fixed to the torque converter and a retainer axially fixing the first section and the second section together in an intermeshing arrangement so the first section and the second section are non-rotatably fixed together,
   the rotor including a rotor carrier supporting a plurality of magnets, the rotor carrier including a rear end facing away from the magnets and toward a front cover of the torque converter,
   the first section, the second section and the retainer being axially between the rear end of the rotor carrier and the front cover of the torque converter.

13. The method as recited in claim 12 wherein the first section includes first teeth and the second section includes second teeth and the first section and the second section are forced axially together so the first teeth intermesh with the second teeth.

14. The method as recited in claim 13 wherein each of the first teeth and each of the second teeth include a respective groove formed therein, the method including axially forcing the retainer into each of the grooves.

15. The method as recited in claim 12 further comprising forming the first section integrally as a single piece with the rotor carrier.

16. The method as recited in claim 12 further comprising fixing the second section to the front cover by a plurality of circumferentially spaced fasteners.

17. The method as recited in claim 12 further comprising providing a retention ring holding the retainer in place on the first section and the second section.

18. The method as recited in claim 17 further comprising providing an elastic element forcing the retention ring axially against the retainer.

19. A hybrid module configured for arrangement in a torque path upstream from a transmission and downstream from an internal combustion engine, the hybrid module comprising:
   a hybrid drive unit including an electric motor including a rotor;
   a torque converter; and
   a connector non-rotatably fixing the rotor to the torque converter, the connector including a first section non-rotatably fixed to the rotor, a second section non-rotatably fixed to the torque converter and a retainer axially fixing the first section and the second section together in an intermeshing arrangement so the first section and the second section are non-rotatably fixed together,
   wherein the first section includes first teeth and the second section includes second teeth, the first teeth intermeshing with the second teeth,
   wherein the first teeth protrude axially away from the rotor and the second teeth protrude axially away from the torque converter.

* * * * *